United States Patent [19]
Clark

[11] Patent Number: 5,976,089
[45] Date of Patent: Nov. 2, 1999

[54] INCREASING THE FRAME RATE OF A PHASED ARRAY IMAGING SYSTEM

[75] Inventor: David W Clark, Windham, N.H.

[73] Assignee: Hewlett-Packard Company, Palo Alto, Calif.

[21] Appl. No.: 09/046,437

[22] Filed: Mar. 24, 1998

[51] Int. Cl.[6] .................................................. A61B 8/00
[52] U.S. Cl. .............................................................. 600/447
[58] Field of Search ................................... 600/443, 447; 73/625–626; 367/100, 7, 11

[56] References Cited

U.S. PATENT DOCUMENTS

| | | | |
|---|---|---|---|
| 4,550,607 | 11/1985 | Maslak et al. | 73/626 |
| 4,917,097 | 4/1990 | Proudian et al. | 128/662.06 |
| 5,188,114 | 2/1993 | Thiele et al. | 128/661.09 |
| 5,249,578 | 10/1993 | Karp et al. | 128/661.01 |
| 5,267,221 | 11/1993 | Miller et al. | 367/140 |
| 5,315,999 | 5/1994 | Kinicki et al. | 128/660.07 |
| 5,322,067 | 6/1994 | Prater et al. | 128/660.07 |
| 5,345,426 | 9/1994 | Lipschutz | 367/103 |
| 5,431,167 | 7/1995 | Savord | 128/660.07 |
| 5,462,057 | 10/1995 | Hunt et al. | 128/661.01 |
| 5,469,851 | 11/1995 | Lipschutz | 128/661.01 |
| 5,522,391 | 6/1996 | Beaudin et al. | 128/660.07 |
| 5,538,004 | 7/1996 | Bamber | 128/662.06 |
| 5,590,658 | 1/1997 | Chiang et al. | 128/661.01 |
| 5,623,928 | 4/1997 | Wright et al. | 600/447 |
| 5,678,552 | 10/1997 | Savord | 128/661.01 |
| 5,690,114 | 11/1997 | Chiang et al. | 128/661.01 |
| 5,779,640 | 7/1998 | Holley et al. | 600/447 |

Primary Examiner—Francis J. Jaworski

[57] ABSTRACT

The present invention is an ultrasound apparatus and method for creating high quality two- or three-dimensional images of a region of interest. The imaging apparatus includes a transmit beamformer for activating a transducer array to emit ultrasound beams along multiple transmit scan lines distributed over a selected scan pattern. Each transmitted ultrasound beam generates several echos that are detected by a receive transducer array connected to a receive beamformer. The receive beamformer synthesizes several receive beams in response to each transmit beam. Each of the synthesized receive beams is steered over the selected pattern in a way that a round-trip beam, corresponding to the transmit beam and the steered receive beam, has a selected round-trip orientation. To arrange the round-trip beams over a predetermined spacing, the receive beams are oversteered (i.e., overcompensated) because the round-trip beams also depend on the orientations of the transmit beams. An interpolator receives two round-trip beams that have substantially the same round-trip orientation and are synthesized by in response to two transmit beams emitted along two neighboring transmit scan lines. The interpolator interpolates the two round-trip beams to form an image signal of a selected beam profile oriented substantially along the round-trip orientation of the two beams. An image generator forms an image of the examined region based on the image signals.

30 Claims, 12 Drawing Sheets

INCREASING THE FRAME RATE OF A PHASED ARRAY IMAGING SYSTEM

FIELD OF THE INVENTION

The present invention relates to ultrasonic, phased array imaging systems and, more particularly, to increasing the frame rate and reducing artifacts in such systems.

BACKGROUND OF THE INVENTION

Phased array ultrasonic imaging systems have been used for producing real-time images of internal portions of the human body. Such systems include a multiple channel transmitter and a multiple channel receiver, either coupled to a single array of ultrasonic transducers using a transmit/receive switch, or coupled separately to a transmit transducer array and a receive transducer array. The ultrasonic transducers, placed in contact with the body, respond to short electrical pulses and emit corresponding pressure waves. The electrical pulses are applied to the individual transducers in a predetermined timing sequence so that the pressure waves, generated by the transducers, are phased to form a transmit beam that propagates in a predetermined direction from the array.

As the transmit beam passes through the body, portions of the acoustic energy are reflected back toward the transducer array from tissue structures having different acoustic characteristics. An array of receive transducers (which may be the same as the transmit array) converts the reflected pressure pulses into the corresponding electrical pulses. Due to different distances, the ultrasonic energy reflected from a tissue structure arrives at the individual transducers of the array at different times. Each transducer produces an electrical signal that is amplified and provided to a processing channel of a receive beamformer. The receive beamformer has a plurality of processing channels with compensating delay elements connected to a summer. The receive beamformer selects the delay value for each channel to collect echoes reflected from a selected focal point. Consequently, when the delayed signals are summed, a strong signal is produced from signals corresponding to this point, but signals arriving from other points, corresponding to different times, have random phase relationships and thus destructively interfere. Furthermore, the beamformer selects the relative delays that control the orientation of the receive beam with respect to the transducer array. Thus, the receive beamformer can steer the receive beam to have a desired orientation and focus it at a desired depth. Both steering and focusing can be performed dynamically.

To collect imaging data, the transmit beamformer controls the transducer array to emit ultrasound beams along multiple transmit scan lines distributed over a desired scan pattern. For each transmit beam, the receive beamformer connected to the transducer array synthesizes a receive beam by using the selected delay. The transmit and receive beams form a round-trip beam (i.e., a "center of mass" beam). The round-trip beams are synthesized over a predetermined angular spacing to create a wedge-shaped scan pattern, or a predetermined linear spacing to create a rectangular scan pattern.

Conventionally, to increase image resolution, the system has to increase the number of round-trip beams that are generated over the image sector. The required sampling (i.e., the number of beams) is in accordance with the Nyquist sampling theory, described in U.S. Pat. No. 5,431,167, which is incorporated by reference. When the sampling is increased, the overall time necessary to obtain the data and to generate the image increases. Furthermore, to create a three-dimensional image, the system has to collect acoustic data over three-dimensions, which increases the acquisition time. However, to image a moving organ, such as the heart, it is important to generate an image as fast as possible, and thus it may be necessary to increase the frame rate (i.e., the number of images generated per unit time) as compared to a conventional system. The increased frame rate avoids image blurring caused by the moving organ. The imaging system can increase the frame rate by faster operation, or by decreasing the number of lines (i.e., the number of beams) employed to produce the image; this in turn reduces the overall resolution of the image. Thus, in a conventional system, there is a trade-off between the resolution and the frame rate.

To increase the frame rate, a conventional imaging system can simultaneously synthesize two beams for each transmit beam over a selected sector. However, the generated images have frequently "artifacts", which are visual anomalies that appear in the displayed image, but are not present on the imaged object. These image anomalies occur due to, for example, a partially blocked aperture or when the round-trip beams don't have the same beam profile. The imaging systems can use a low pass filter that in fact "averages" signals of neighboring receive beams to remove the artifacts. The averaging, of course, reduces the resolution. It may be useful to design an imaging system that does not use this filtering to remove the artifacts.

An imaging system of another type may further increase the frame rate by simultaneously synthesizing more than two receive beams for each transmit beam and combining two receive beams synthesized from subsequently emitted transmit beams. Specifically, the transmit beamformer generates a transmit beam, and then the receive beamformer synthesizes four receive beams from the echos. An interpolator interpolates two synthesized receive beams to obtain a combined beam oriented along a selected direction. When synthesizing four receive beams, the imaging system obtains two interpolated receive beams for each transmit event; this technique is also called 4→2 parallel technique. The image data is formed from the two round-trip beams that again depend on the transmit beams and the corresponding receive beams. However, in this technique, the transmit and receive beams do not have a purely translational symmetry; there is also a mirroring component of the symmetry. The mirroring component may cause non-uniform profiles of the interpolated, round-trip beams when part of the transducer aperture is blocked (for example, by a rib) even though nominally the interpolated beam is aligned along the correct direction. Thus the partially blocked aperture may cause both an amplitude non-uniformity and a steering non-uniformity, both which can still be seen as a line-to-line artifact. While the 4→2 parallel technique works very well and provides a significant improvement over the prior art, there is still a need to eliminate some artifacts. Furthermore, there is also a need to further increase the sampling rate.

Therefore, there is a need for a phased array imaging system that operates at a high sampling rate, reduces the artifacts and is capable of producing two-or three-dimensional images of moving body organs.

SUMMARY OF THE INVENTION

The present invention is an ultrasound apparatus and method for creating high quality images of a region of interest. The ultrasound apparatus operates at a high sampling rate and is capable of producing two- or three-dimensional images of moving body organs. The images minimize or completely eliminate artifacts caused by parallel beamforming.

In one aspect, the imaging apparatus includes a transmit beamformer for activating a transducer array to emit ultrasound beams along multiple transmit scan lines distributed over a selected scan pattern. Each transmitted ultrasound beam generates several echos that are detected by a receive transducer array connected to a receive beamformer. The receive beamformer synthesizes several receive beams in response to each transmit beam. Each of the synthesized receive beams is steered so that a round-trip beam, corresponding to the transmit beam and the steered receive beam, has a selected round-trip orientation. To arrange the round-trip beams over a selected spacing, the receive beams are oversteered (i.e., overcompensated) because the round-trip beams also depend on the orientations of the transmit beams. An interpolator receives two round-trip beams that have substantially the same round-trip orientation and are synthesized in response to two transmit beams emitted along two neighboring transmit scan lines. The interpolator interpolates the two round-trip beams to form an image signal of a selected beam profile oriented substantially along the round-trip orientation of the two beams. An image generator forms an image of the examined region based on the image signals.

In another aspect, an ultrasound apparatus for imaging a region of interest includes a transmit beamformer, a receive beamformer, an interpolator, and an image generator. A transmit array of ultrasound transducer elements is connected to the transmit beamformer constructed and arranged to transmit an ultrasound beam along multiple transmit scan lines distributed over a region of interest. A receive array of ultrasound transducer elements is connected to the receive beamformer constructed and arranged to synthesize at least four receive beams in response to each transmit beam. The receive beamformer is constructed to steer each synthesized receive beam to have a selected orientation so that a corresponding round-trip beam, formed by the transmit beam and the steered receive beam, has a selected round-trip orientation. The interpolator is connected to the receive beamformer and is arranged to obtain two of the round-trip beams having substantially the same round-trip orientation and being synthesized in response to two transmit beams emitted along two neighboring transmit scan lines. The interpolator is constructed and arranged to interpolate the two round-trip beams to form an image signal of a desired beam profile oriented substantially along the round-trip orientation. The image generator is constructed and arranged to form an image of the region of interest based on the image signals.

The above aspects may include one or more of the following features:

The ultrasound apparatus further includes a T/R switch connected to the transmit array and the receive array, wherein the transmit and receive arrays are formed by the same transducer array.

The receive beamformer is further constructed to synthesize at least eight receive beams. The receive beamformer is further constructed to steer the synthesized receive beams dynamically.

The transmit beamformer is constructed to transmit the transmit beams along the scan lines having a selected angular spacing over a selected scan pattern, and the receive beamformer is constructed to synthesize the receive beams so that said round-trip beams are distributed over the same scan pattern.

The scan pattern may be a two-dimensional scan pattern (e.g., a wedge-shaped scan pattern, a parallelogram-shaped scan pattern), or a three-dimensional scan pattern (e.g., a conical scan pattern, a pyramidal scan pattern, a cylindrical scan pattern, a three-dimensional parallel scan pattern, or other patterns). Depending on the scanning, the round-trip beams are generated over the two-dimensional pattern with a predetermined angular spacing, or the three-dimensional pattern with a predetermined angular spacing. Furthermore, three-dimensional images may be formed by performing a multiplicity of two-dimensional scans over a wedge-shaped pattern or a parallelogram-shaped pattern.

The interpolator includes a line buffer, a multiplier, and a summer. The line buffer may be constructed to delay a first of the two receive beams synthesized first in time so that the two receive beams can be summed by the summer. The multiplier is constructed to multiply signals of the round-trip beam so that the interpolated beams have a selected size and shape. Alternatively, the multiplier is constructed to multiply signals of the round-trip beam so that the interpolated beams are uniform in size and shape The receive beamformer is an analog or digital beamformer, and the interpolator is also an analog or a digital interpolator. The interpolator uses interpolation coefficients that are selected to obtain the interpolated beams of uniform size or shape.

The ultrasound apparatus uses a transmit and receive aperture, wherein the transmit aperture is smaller than the receive aperture. The transmit aperture produces the transmit beam that is about three time wider than the receive beam. At least one of the apertures is apodized with a Hamming function.

DETAILED DESCRIPTION OF PREFERRED EMBODIMENTS

Figure 1:
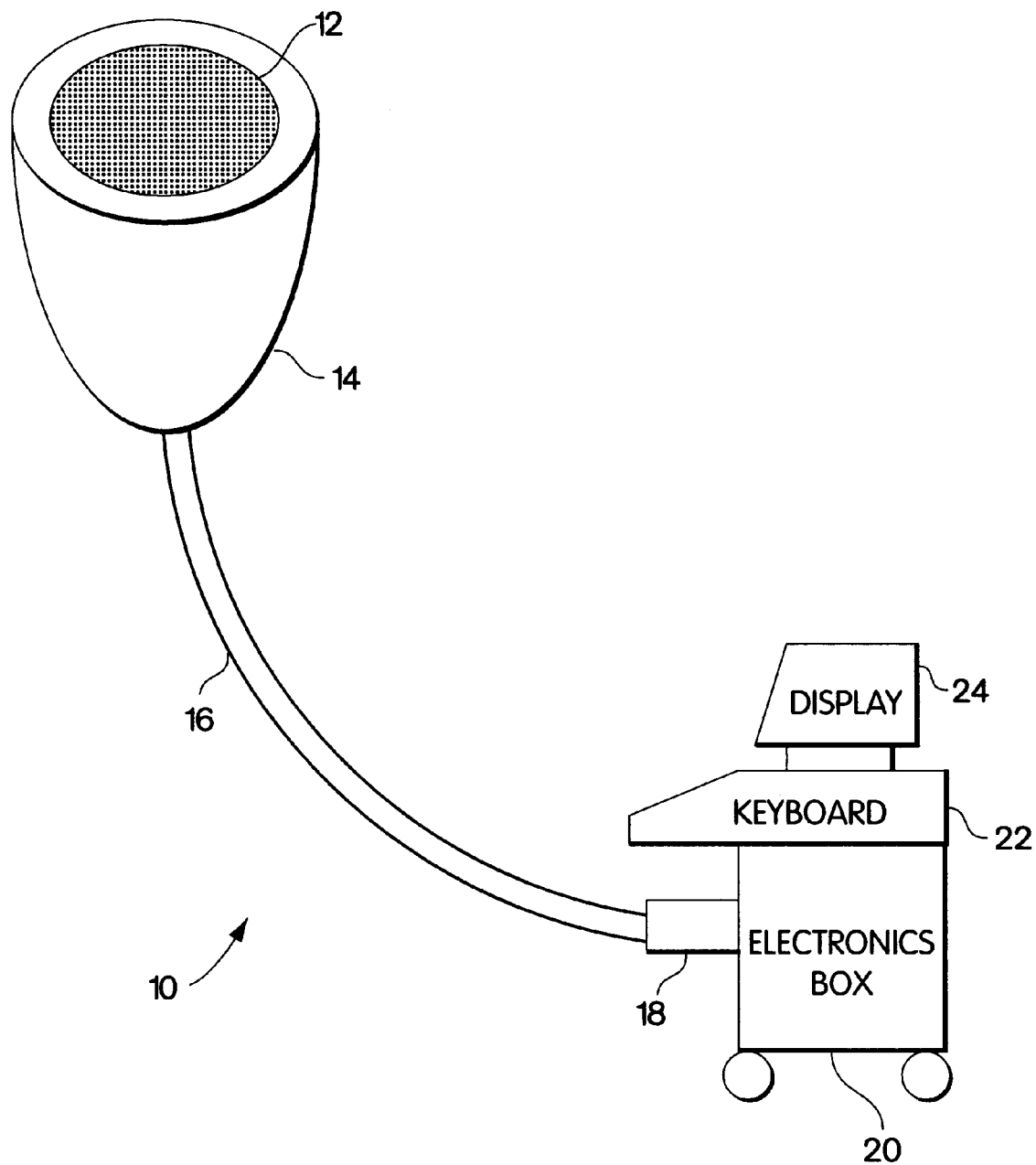
FIG. 1 illustrates a phased array ultrasonic imaging system.

Referring to FIG. 1, a phased array ultrasonic imaging system 10 includes an array of transducer elements 12 located in a transducer handle 14, positioned by a technician for imaging a region of interest. Transducer handle 14 is connected via a transducer cable 16 and a transducer connector 18 to an electronics box 20, which includes transmit and receive beamformers. Electronics box 20 is interfaced with a keyboard 22 and provides imaging signals to a display 24.

The transducer array may be arranged as a one dimensional array or a two dimensional array such as a circular array. The same transducer elements may be used to emit a transmit beam and to detect a receive beam. Alternatively, array 12 may include separate transmit and receive arrays of transducer elements distributed over a selected area or distributed in a semi-random pattern. Transducer handle 14 may include transmit pulse generators and the associated high voltage drivers, receive pre-amplifiers, delay and summing circuits. Transducer handle 14 may also include several multiplexers. Transducer cable 16 includes signal wires, power supply wires, clock lines, and serial digital data lines including a digital control line and an analog reference current line.

Figure 2:
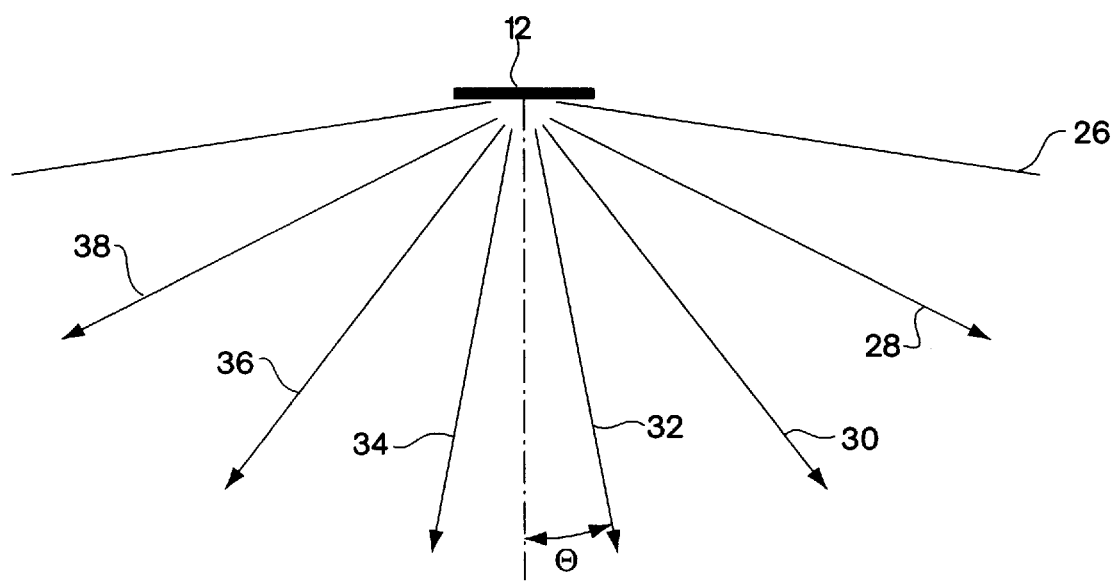
FIG. 2 illustrates a plurality of transmit beams emitted from an array of transducer elements at selected steering angles to form a desired scan pattern.

Referring to FIG. 2, to form transmit beams, a transmit beamformer (not shown) energizes each transducer element of array 12 in the active aperture (described below) with a pulse having a selected delay. The transmit beamformer selects the delay values for each transducer element to steer the transmitted ultrasound energy at a selected angle θ relative to array 12 and to focus the transmitted energy to a selected focal depth. The steering angles depend on a desired scan pattern and on the sampling and processing technique that is used.

When the same transducer elements are used to emit the transmit beam and detect the receive beams, imaging system 10 includes a transmit/receive switch (T/R switch not shown) to switch between the transmit beamformer and the receive beamformer. The T/R switch includes N individual switches connected to the N transducer elements. During transmission of ultrasound energy, the T/R switch protects the receive beamformer. After emitting the transmit beam, the T/R switch connects the transducer elements to the receive beamformer.

Figure 3:
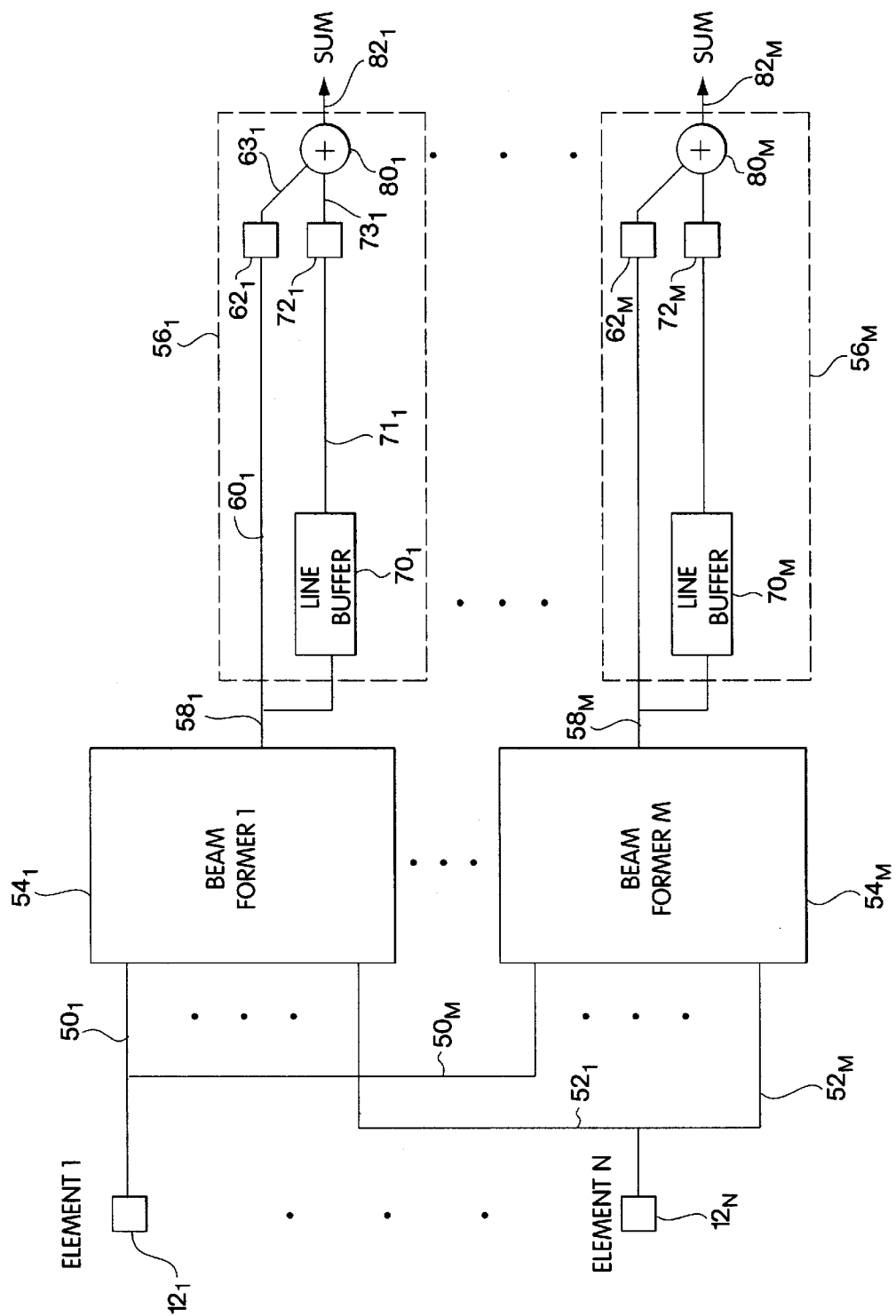
FIG. 3 illustrates schematically transducer elements of a phased array imaging system connected to a plurality of parallel receive beamformers and interpolation circuits.

Referring to FIG. 3, the N receive transducer elements $12_1, 12_2, \ldots 12_N$ (only transducers $12_1$ and $12_N$ are shown) provide to receive beamformers $54_1, \ldots 54_M$ amplified induced signals via leads $50_1, 50_2, \ldots 50_M$ and via leads $52_1, 52_2, \ldots 52_M$, wherein M is the number of receive scan lines simultaneously generated (synthesized) for each transmit beam. Receive beamformers $54_1, \ldots 54_M$ in turn provide receive beam signals to interpolators $56_1, \ldots 56_M$, respectively, all of which include essentially equivalent interpolation circuits. The interpolation circuit of interpolator $56_1$ includes a line buffer $70_1$, multipliers $62_1$ and $72_1$, and a summing junction $80_1$. A lead $60_1$ connects a beamformer output $58_1$ to multipliers $62_1$ directly, while multiplier $72_1$ receives output $58_1$ delayed in line buffer $70_1$.

Receive beamformer $54_1$ synthesizes a receive beam that yields the corresponding round-trip beam of a selected direction, as is described below. Line buffer $70_1$ receives output signal $58_1$ and delays it for a time period equal to the time necessary to emit the next transmit beam. After emission of the next transmit beam, receive beamformer $54_1$ synthesizes another receive beam, having a direction that yields the corresponding round-trip beam of the same direction as the selected direction of the prior round-trip beam. That is, these two receive beams (synthesized from two subsequent transmit beams) are synthesized so that their round-trip beams are aligned along substantially the same direction. Multiplier $72_1$ multiplies the delayed output signal $71_1$ by a predetermined constant. Multiplier $62_1$ multiplies signal $60_1$ (corresponding to the second synthesized receive beam) by a predetermined constant. Summing junction $80_1$ adds output signals $63_1$ and $73_1$ to obtain a composite beam signal. The values of the multiplication constants depend on the focus point, and are calculated to obtain a selected beam profile for each interpolated (composite) beam.

Figure 3A:
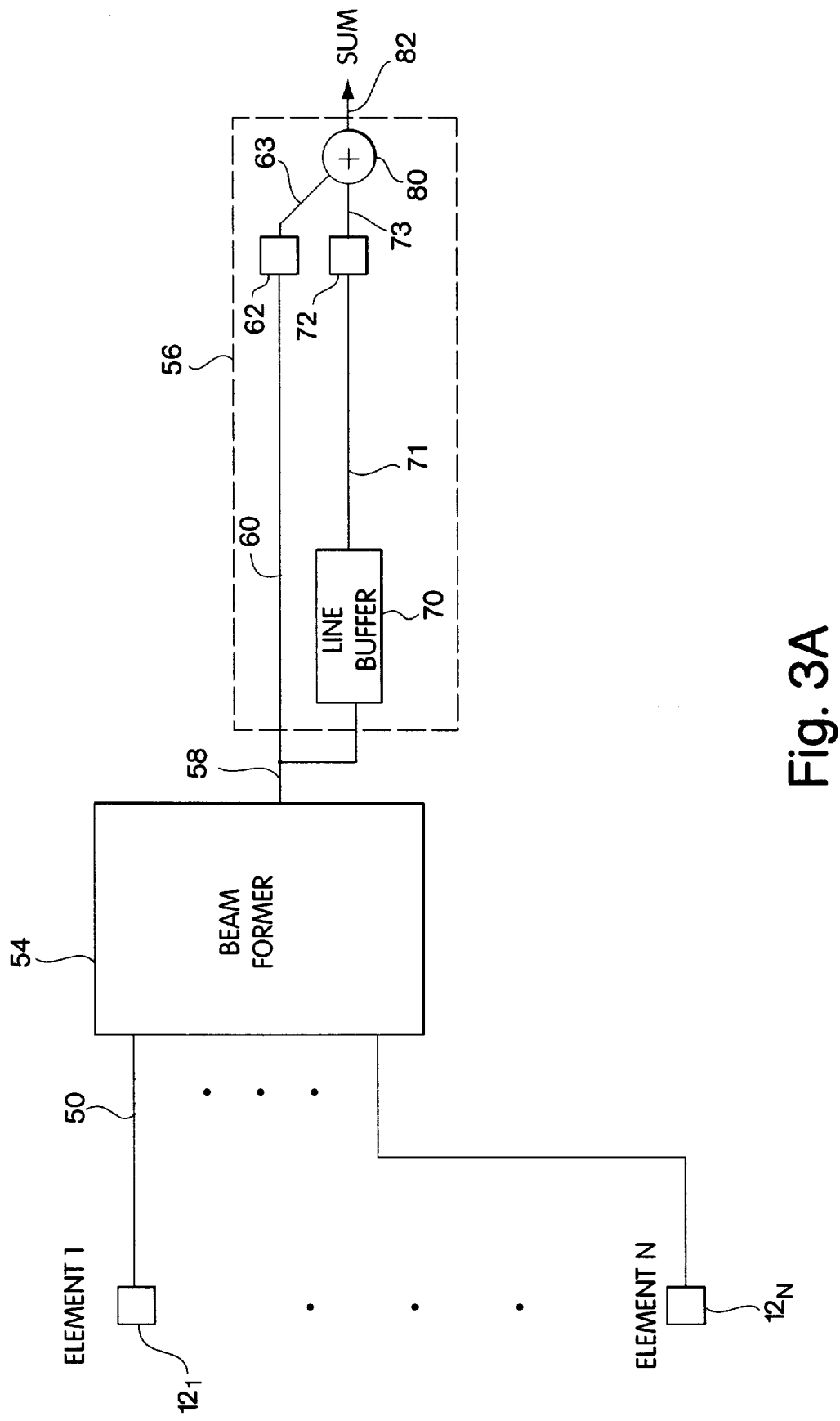
FIG. 3A illustrates schematically transducer elements of a phased array imaging connected to a sequential beamformer and an interpolation circuit.

Alternatively, referring to FIG. 3A, imaging system 10 includes only one sequential receive beamformer designed to synthesize the receive beams sequentially. As is known in the art, the receive beamformer includes a set of delays and summing junctions. The coefficients and parameters are time interleaved among several different beam setups so that the data from the beamformer is time interleaved for several receive beams. This arrangement reduces the synthesized receive data rate per each transmit beam, but uses the hardware more efficiently. There is a continuum of various designs between the parallel beamformer arrangement, shown in FIG. 3, and the sequential beamformer arrangement, shown in FIG. 3A, such as having two parallel beamformers, which are time interleaved, or are sharing part but not all of the beamformer hardware.

Figure 4A:
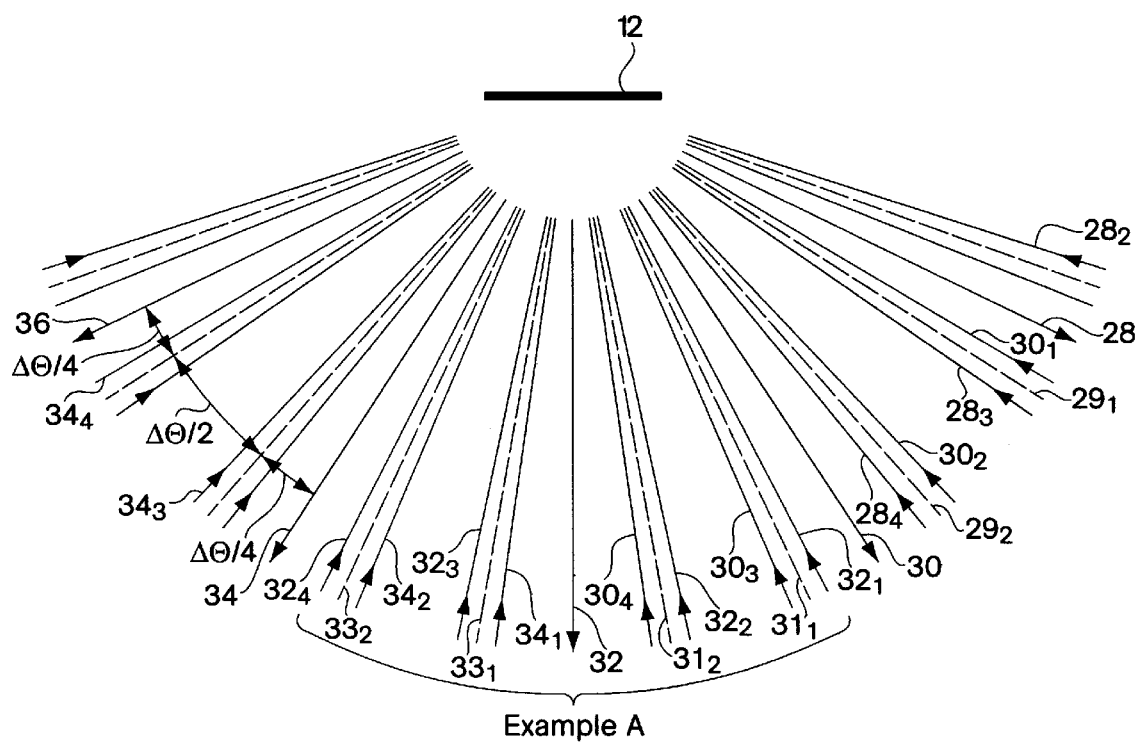
FIG. 4A illustrates a sector scan pattern, wherein the receive beamformers generate for each transmit beam four receive beams at selected steering angles.

In general, imaging system 10 emits a transmit beam along a transmit scan line and in response synthesizes several receive beams. By reducing the number of transmit lines emitted, the imaging system can increase the acquisition rate without reducing the predetermined resolution. FIG. 4A depicts a sampling mode with four receive beams synthesized for each transmit beam emitted along a transmit scan line and FIG. 4B depicts a mode synthesizing eight receive beams for each transmit beam emitted along a transmit scan line.

Referring to FIG. 4A, array 12 emits a beam of ultrasound energy focused at a selected depth along a transmit scan line 32. Array 12 then detects ultrasound echoes, and four receive beamformers $54_1, 54_2, 54_3,$ and $54_4$ (shown in FIG. 3) simultaneously synthesize receive beams along receive scan lines $32_1, 32_2, 32_3,$ and $32_4$, respectively, as shown by Example A. The image depends on the intensity profile of the round-trip beam (i.e., "the center of mass") between the transmit beam and the receive beam. The desired round-trip beams, corresponding to transmit scan line 32, have orientations shown as lines $31_1, 31_2, 33_1$ and $33_2$. Therefore, the beamformers oversteer (or warp) receive lines $32_1, 32_2, 32_3$ and $32_4$ farther away from their desired round-trip orientations so that their centers of mass have the desired orientations, shown by lines $31_1, 31_2, 33_1$ and $33_2$. Next, array 12 transmits a pulse of ultrasound energy focused at a selected depth along a transmit scan line 34. Array 12 then detects ultrasound echoes and the four receive beamformers simultaneously synthesize receive beams along receive scan lines $34_1, 34_2, 34_3,$ and $34_4$, all of which are again oversteered. The interpolators combine receive lines $32_4$ and $34_2$ to obtain line $33_2$, and combine receive lines $32_3$ and $34_1$ to obtain line $33_1$, etc. When combining each two receive scan lines, the interpolators also multiply the receive signals by coefficients to form an image line having a desired profile. Thus, the interpolators provide two interpolated lines for each set of four synthesized receive lines (i.e., the 4→2 parallel technique). This sampling also provides a slight signal-to-noise ratio gain.

For example, to generate a 90° scan sector, the imaging system emits beams along the transmit scan lines with an angular spacing of 3° and synthesizes the receive beams along receive scan lines that are oversteered so that the corresponding round-trip scan lines have an angular spacing of 1.5° (Alternatively, the transmit scan lines are spaced 1.5° apart and the round-trip lines are spaced 0.75°.) As described in U.S. Pat. No. 5,431,167, which is incorporated by reference, in one embodiment, the number of generated transmit lines can be further reduced by using non-uniform angular sampling at large angles without reducing the image resolution. The round-trip lines can be spaced on a grid uniform in the reciprocal of the cosine of the steering angle (i.e., the angular spacing between the round-trip lines is increased by $1/\cos\phi$).

Figure 4B:
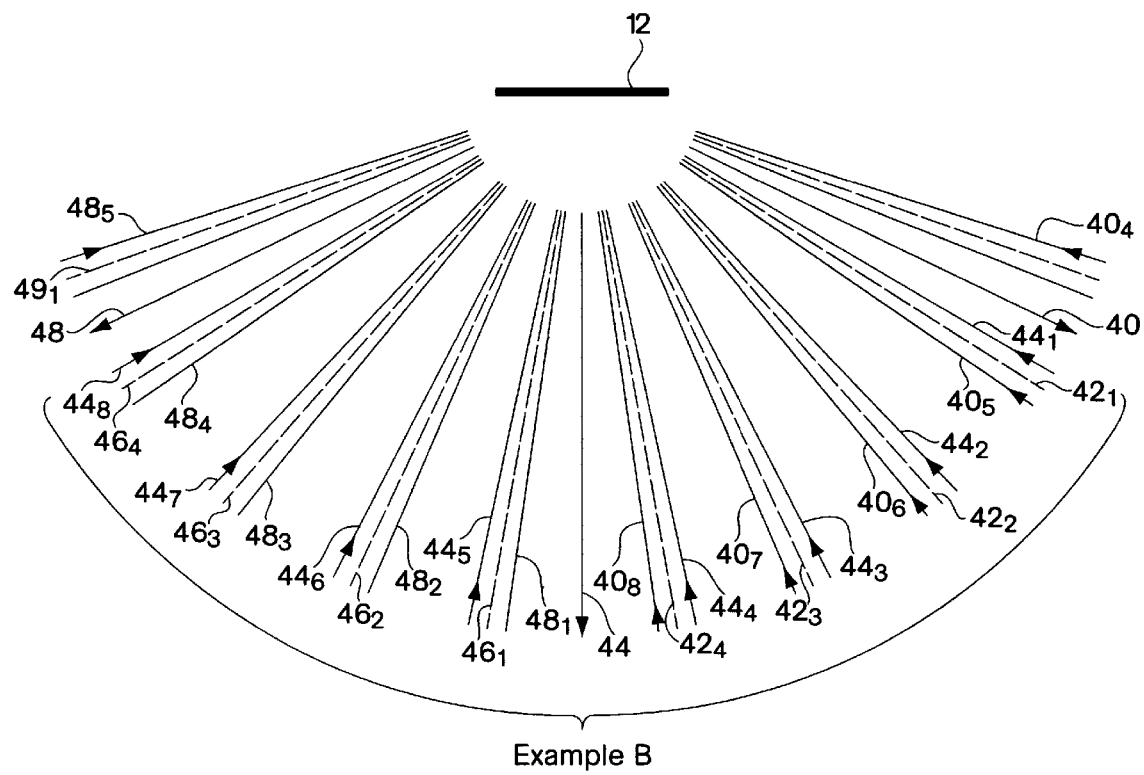
FIG. 4B illustrates a sector scan pattern, wherein the receive beamformers generate for each transmit beam eight receive beams at selected steering angles.

Referring to FIG. 4B, alternatively, array 12 emits a pulse along a transmit scan line 44, and then eight receive beamformers $54_1$, $54_2$, ... and $54_8$ (FIG. 3) simultaneously synthesize receive scan lines $44_1$, $44_2$, ... and $44_8$, which are oversteered by selected oversteer angles so that the round-trip lines are in directions $42_1$, $42_2$, $42_3$, $42_4$, $46_1$, $46_2$, $46_3$ and $46_4$, as shown by Example B. Next, array 12 emits another pulse along a transmit scan line 48 and the receive beamformers synthesize receive lines $48_1$, $48_2$, ... $48_8$, which are again oversteered by selected oversteer angles with respect to round-trip directions $46_1$, $46_2$, $46_3$, $46_4$, $49_1$, $49_2$, $49_3$, and $49_4$ (not shown in FIG. 4B). The interpolators multiply the synthesized receive signals by selected coefficients, and the summing junctions add the scaled pairs of the receive scan lines (i.e., summing junction $72_5$ adds lines $48_1$ and $44_5$, summing junction $72_6$ adds lines $48_2$ and $44_6$, summing junction $72_7$ adds lines $48_3$ and $44_7$, etc.) to obtain image lines in the $46_1$, $46_2$, $46_3$ and $46_4$ directions. Thus, the interpolators provide interpolated lines for each set of eight receive synthesized in response to one transmit line; this is called the 8→4 parallel technique because four image lines are interpolated from eight receive lines.

The imaging system repeats this sampling process to acquire data over a 90 degree sector. The receive beamformers oversteer the receive beams to obtain the round-trip lines in the desired directions, as illustrated above. The oversteer angles depend on the angle of the transmit scan line. The interpolators always interpolate two receive beams with their receive scan lines having the round-trip line in the same direction and provide image lines of desired profiles. Since the interpolated round-trip beams are aligned, there are no artifacts arising from the varying beam profile of the round-trip beams.

As shown in FIG. 4B, the transmit beamformer orients the transmit scan lines with an angular spacing of 6° and the receive beamformers connected to the interpolators generate the image lines spaced 1.5° apart. When employing the 8→4 parallel technique, there is a slight signal to noise trade-off, because the round-trip beams become weaker as the receive beam is steered farther from the transmit scan lines; typically, this difference is a fraction of a decibel. To be able to synthesize eight receive scan lines from a single transmit line, the imaging system employs a larger transmit beam profile, which is done, for example, by decreasing the active aperture.

In general, in the vicinity of the focal depth of the transmit beam, the transmit beam pattern is relatively narrow in cross section. Both the transmit and receive beam profiles determine the effective receive angle of the round-trip line. The local narrowing of the transmit profile causes the effective round-trip angle to vary with depth, which in turn can distort the ultrasound image. As described in U.S. Pat. No. 5,462,057, which is incorporated by reference, the imaging system can also compensate for this distortion by employing dynamic steering when synthesizing the receive beams. When employing the 8→4 technique, however, the aperture is decreased, which increases the depth of field of the transmit beam (i.e., the beam is defocused). The defocused beam has less local narrowing and thus, the 8→4 technique needs less dynamic steering than a conventional technique.

Figure 5:
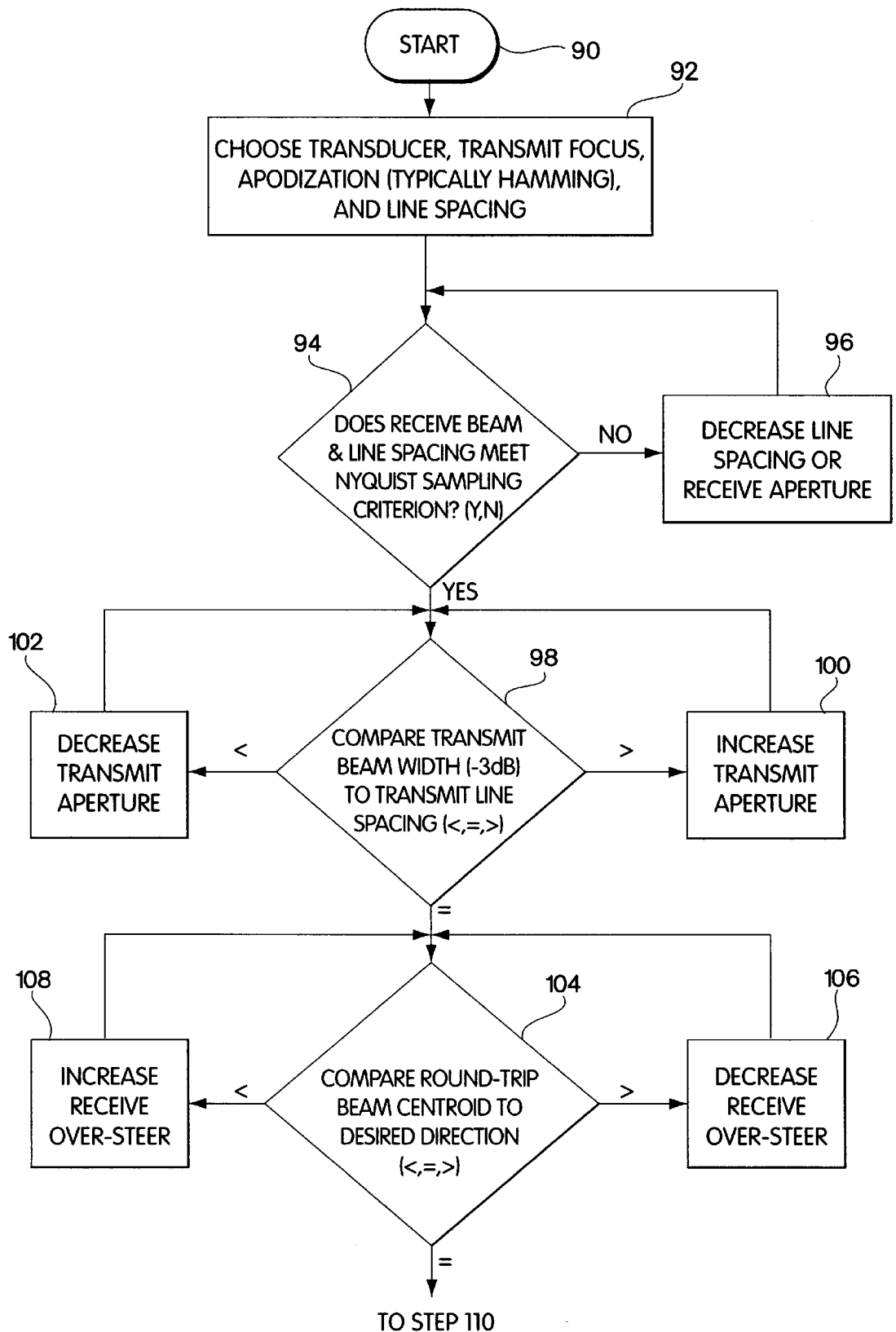
FIGS. 5 and 5A are flow diagrams of a steering compensation technique and an interpolation technique.
Figure 5A:
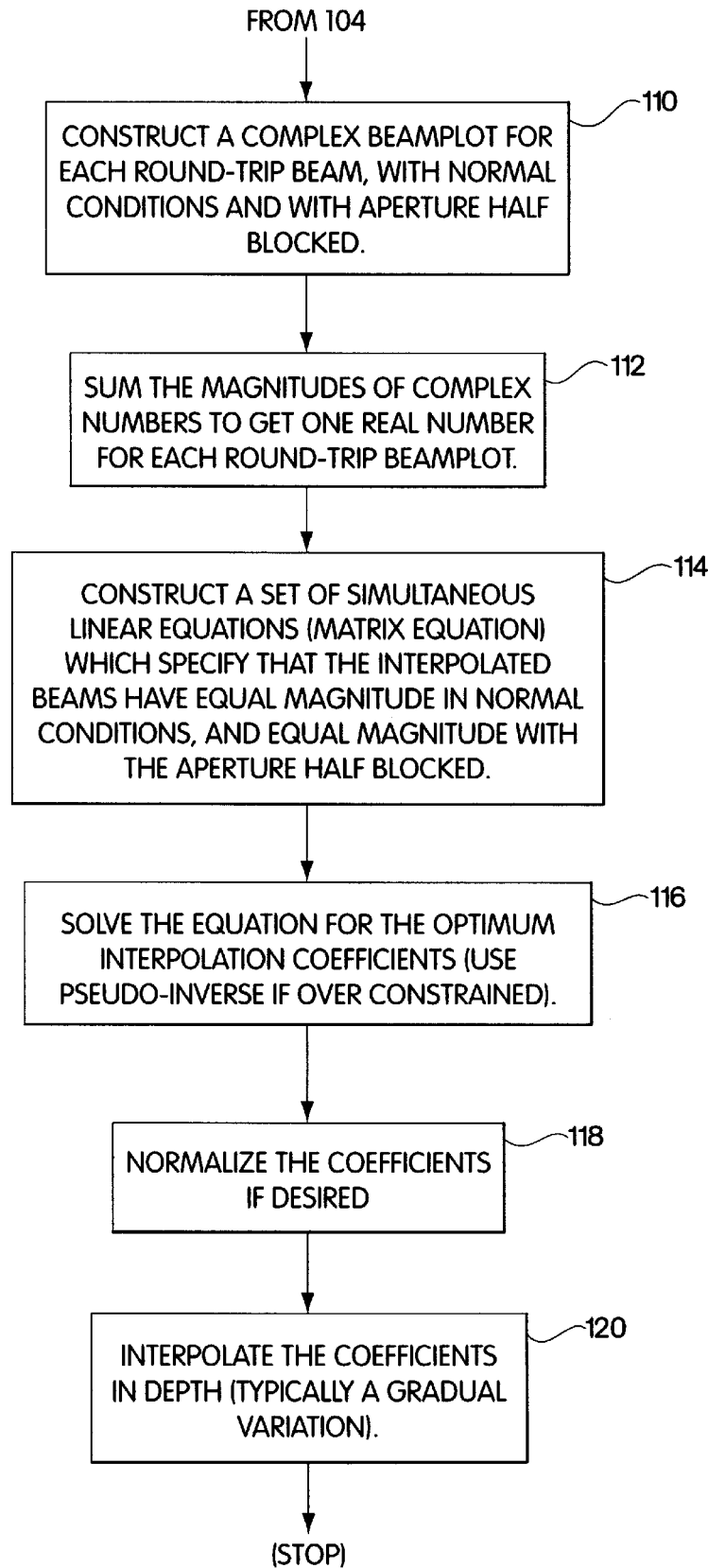

Imaging system 10 employs the above-described steering compensation and interpolation technique, which is summarized in general terms in FIGS. 5 and 5A. Initially, the transmit beamformer selects the transmit focus, apodization and line spacing the transmit beams (step 92). Both the transmit and receive beamformers may use Hamming apodization as described, for example, in U.S. Pat. No. 4,917,097. The Hamming apodization controls the distribution of the array sensitivity across the active aperture, achieves a narrower transmit aperture and low close-in side lobes on the receive beams. Usually, the transmit aperture is smaller than the receive aperture. In steps 94 and 96, the receive beamformer selects the receive line spacing according to Nyquist sampling criteria. Next, the system selects iteratively the size of the transmit aperture that gives, at −3dB, the transmit beamwidth equal to the transmit line spacing (steps 98–102). In step 98, the system compares the transmit beamwidth with the transmit line spacing. If the transmit beamwidth is larger than the transmit line spacing, the system increases the transmit aperture to decrease the transmit beamwidth (step 100). Alternatively, the system decreases the transmit aperture to increase the transmit beamwidth (step 102).

As described above, in response to the transmit beam one or several parallel receive beamformers synthesize the receive beams. In step 104, the system calculates the direction of a round trip beam centroid, for each synthesized receive beam, and compares it to the desired direction (i.e., the direction determined from the receive line spacing). Depending on this comparison, the beamformer decreases the amount of oversteering (step 106) or increases the amount of oversteering (step 108). The oversteer angles depends on the angle of the transmit scan line at the point of interest; however, since the transmit beam is relatively broad, the oversteer angle does not vary substantially and may even be constant. Steps 110 through 120 describe the process for designing interpolator. These steps will be explained in connection with beam plot simulations shown in FIGS. 6 through 11.

Referring to FIGS. 6 through 11, several beamplot simulations were performed using a system with 64 transducer element phased array. The transmit beamformer had a transmit focus at 8 centimeters and a receive depth at 16 centimeters. The system had transmit lines spaced 6° apart and the receive lines were steered in a way that provided 1.5° round-trip line spacing. The size of the aperture was designed by iteratively executing beamplot simulations for different selected values, as described in steps 98–102. The beam plots shown in FIGS. 6 through 11 employed a 45% transmit aperture, which gave the transmit beamwidth equal to the transmit line spacing at −3dB. The selected line spacing is consistent with the Hamming apodization described above.

Figure 6C:
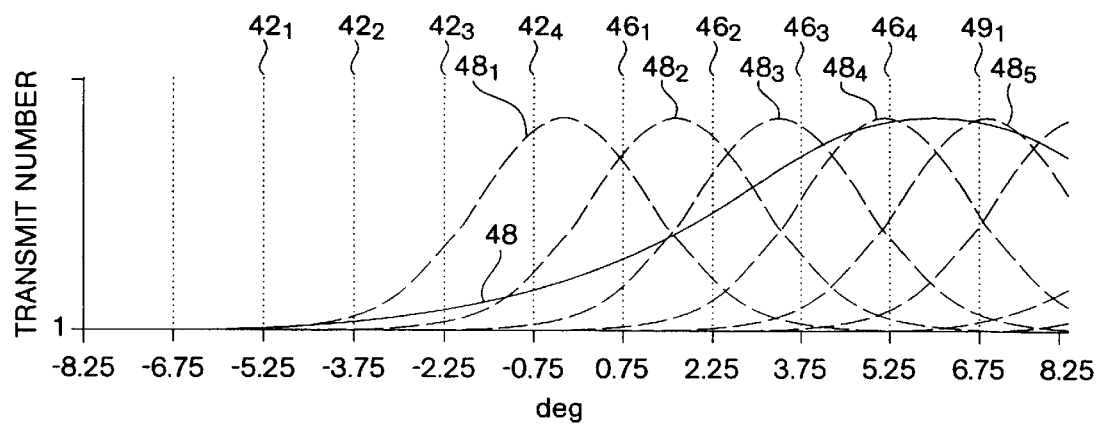
FIGS. 6A, 6B and 6C are beam plot simulations of the transmit and receive beams (illustrated in FIG. 4B) generated by employing the steering compensation technique.
Figure 6B:
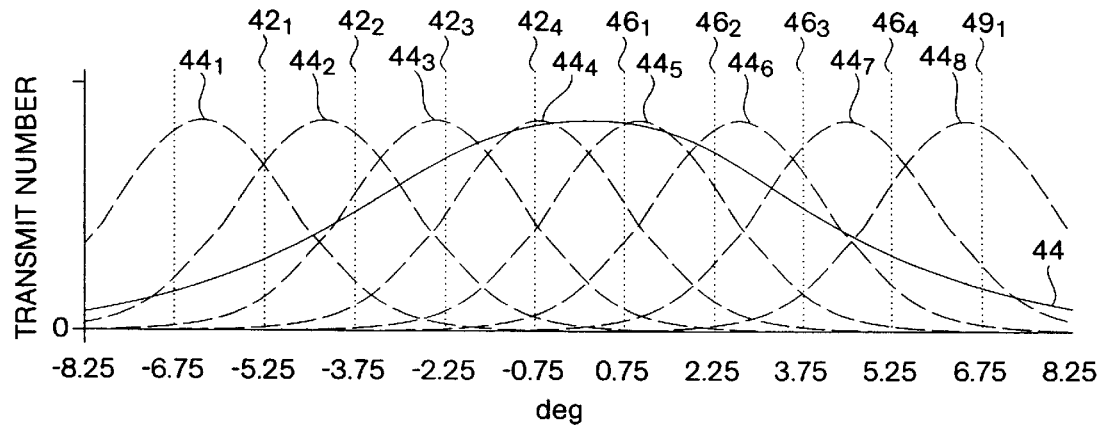
Figure 6A:
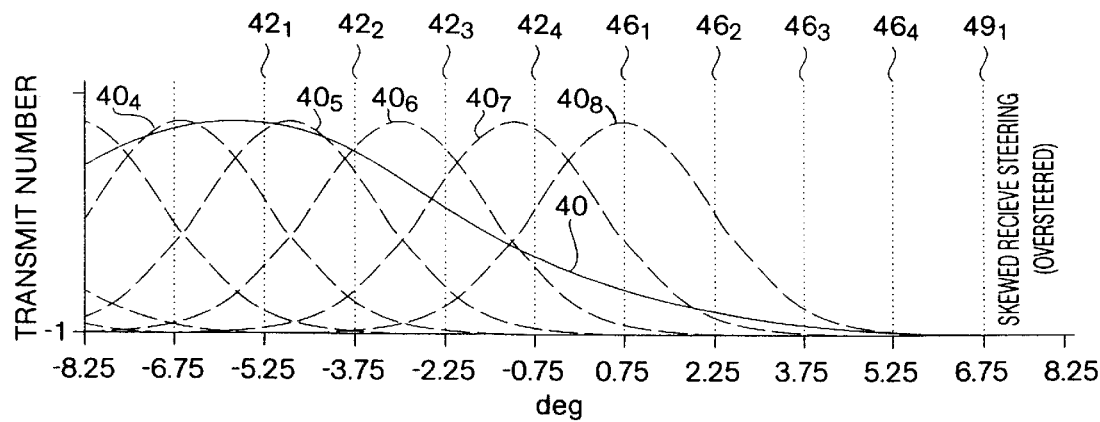
Figure 7C:
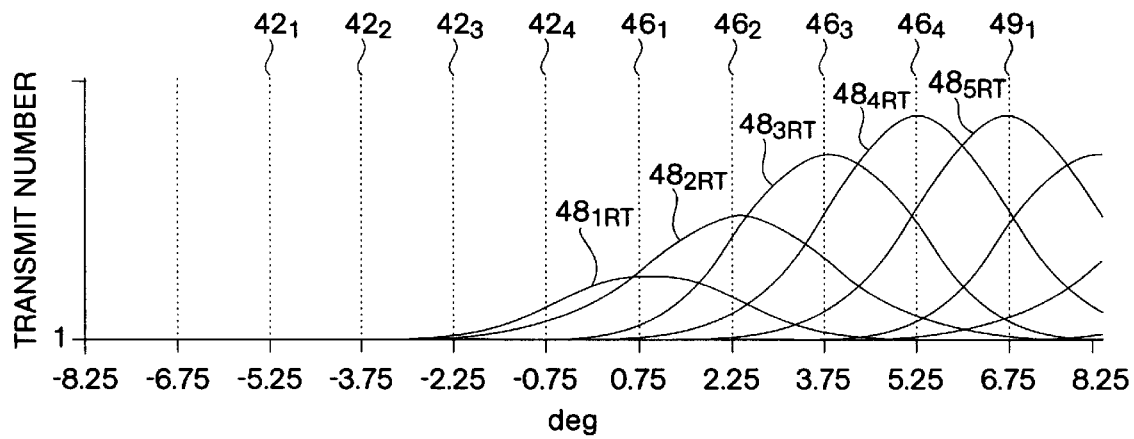
FIGS. 7A, 7B and 7C are beam plot simulations of round-trip beams each formed by the transmit and receive beams shown in FIGS. 6A, 6B and 6C, respectively.
Figure 7B:
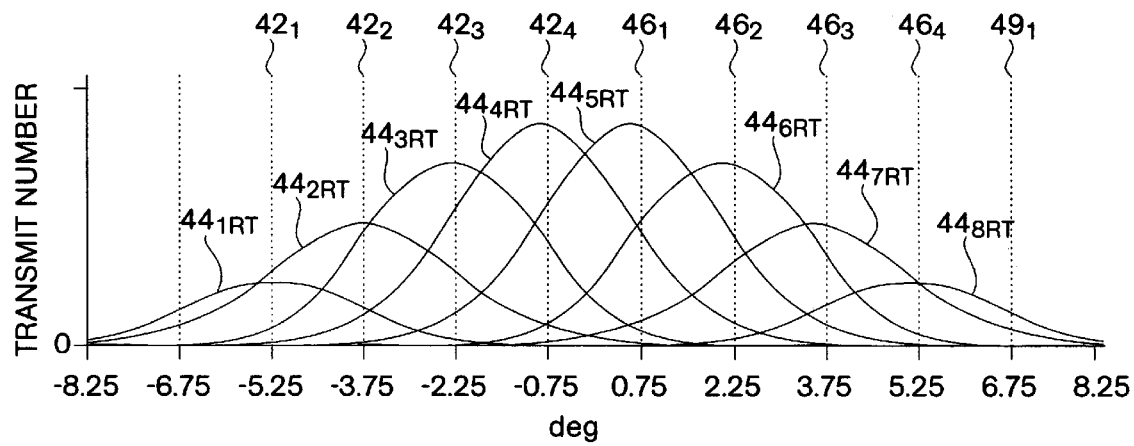
Figure 7A:
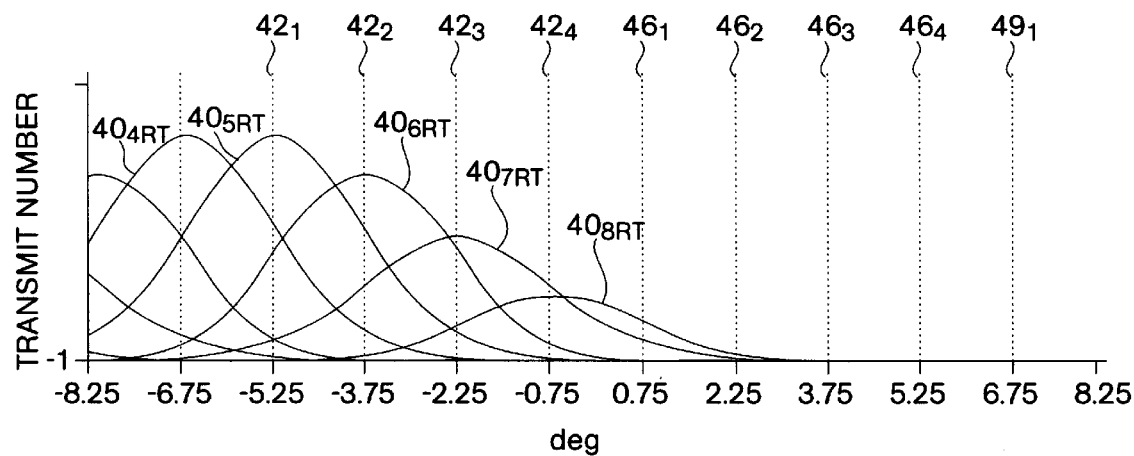

FIGS. 6A, 6B and 6C are plots of transmit beam lines 40, 44, and 48 (also shown in FIG. 4B) and the corresponding receive beam plots $40_4$, $40_5$, ... $40_8$, $44_1$, $44_2$, ... $44_8$, and $48_1$, $48_2$, ... $48_8$, respectively. For transmit beam plot 44 located at 0 degrees, the receive beams are synthesized (and plotted) at nominal receive angles of ±0.75°, 2.25°, 3.75°, and 5.25° plus the oversteer receive angles ±0.12°, 0.40°, 0.75°, and 1.20° so that the round-trip beams $42_1$ ... $42_4$, $46_1$ ... $46_4$ are aligned exactly on 1.5° increments at a depth of 16 centimeters. FIGS. 7A, 7B and 7C are plots of the round-trip beams formed by the transmit beams and the receive beams plotted in respective FIGS. 6A, 6B and 6C. Round-trip beamplots $44_{1RT}$, $44_{2RT}$, ... $44_{8RT}$ correspond to the transmit beam emitted in direction 44 and the receive beams synthesized in directions $44_1$, $44_2$, ... $44_8$, respectively. The directions of the round-trip beams under normal conditions are properly aligned with the 1.5° spaced lines $42_1$, ... $42_4$, $46_1$, ... $46_4$ because the receive beam directions were oversteered to make the round-trip directions correct before interpolating the beams. When the aperture is half-blocked, the receive beam directions change very little because the receive beams are much narrower than the transmit beams (the transmit beams shift, but the receive beams do not). The plotted round-trip beams are about 15% to 20% wider than when using the 4→2 parallel technique (shown in FIG. 4A), due to the broader transmit beam.

Referring to FIG. 5A, each round-trip beamplot (shown in FIGS. 7A–7C) is a list of complex numbers, which specify the amplitude and phase of the synthesized signal received from a hypothetical point targeted at various lateral angles at the specified depth of 16 centimeters. The beamplots were all computed and plotted at the 0° direction to minimize the effects of obliquity and element factor. To simplify the interpolator design, the magnitudes of the complex numbers synthesized for each receive beam are added to obtain a single magnitude number representing each round-trip beam (step 112). The beam magnitudes are used to compute the interpolator coefficients, even though the coefficients are ultimately used to combine the complex numbers representing the beams and not just used to combine the magnitudes. This simplification allows the use of easy linear algebra instead of nonlinear iteration, and the approximate results are good enough to justify this approximation. The beam magnitudes are used to build a matrix equation based on a set of simultaneous linear equations, as is described below.

In step 114, simultaneous linear equations are used to calculate interpolation coefficients used by interpolators shown in FIGS. 3 and 3A. These equations specify the goals of balancing the resulting beams formed by interpolating two round-trip beams that are identically aligned and are formed from two transmit beams emitted along two neighboring transmit lines. With the round-trip beams already oriented correctly before the interpolation, the interpolation coefficients can be used for optimizing a selected characteristic of the image. The selected characteristic is, for example, the beam profile of the interpolated beam. In a preferred embodiment, the interpolation coefficients are selected so that the interpolated beams (i.e., the balanced beams) have substantially similar profiles both under normal conditions and with the aperture half blocked. This interpolation goal can be expressed by the following conditions:

(a) The sum of the inner combined beams (i.e., those beams closest to the transmit direction) in normal beam conditions is 1.
(b) The sum of the outer combined beams (i.e., those beams farthest from the transmit direction) in normal beam conditions is 1.
(c) The difference of the inner combined beams (i.e., those beams closest to the transmit direction) in half-blocked beam conditions is 0.
(d) The difference of the outer combined beams (i.e., those beams farthest from the transmit direction) in half-blocked beam conditions is 0.
(e) The difference between the sum of inner beams and the sum of outer beams in half-blocked beam conditions is 0.

These conditions ensure that the four interpolated beams will have substantially equal magnitudes under normal conditions, and also equal magnitudes with the aperture half blocked. (However, there are different mathematically equivalent ways to construct the equations. The symmetry of how the beams are constructed assures that the difference equations under normal conditions are not needed).

In the following equations, the round-trip beams are labeled $N_{1RT}$, $N_{2RT}$, ..., $N_{8RT}$ for normal beam conditions, and $B_{1RT}$, $B_{2RT}$, ..., $B_{8RT}$ for half-blocked aperture conditions, wherein the subscripts refer to the beams shown in FIGS. 7A–7C. The interpolation coefficients are labeled $C_1$, $C_2$, $C_3$, $C_4$. The interpolators shown in FIGS. 3 and 3A require at least four scaling constants $C_1$, ... $C_4$.

Equation 1
The above condition (a) is expressed as the following equation having a gain constant arbitrarily chosen to be 1:

$$(C_1 \cdot N_{4RT} + C_2 \cdot N_{8RT}) + (C_1 \cdot N_{5RT} + C_2 \cdot N_{1RT}) = 1$$

$$C_1 \cdot (N_{4RT} + N_{5RT}) + C_2 \cdot (N_{8RT} + N_{1RT}) = 1$$

Equation 2
The above condition (b) is expressed as the following equation having the same gain constant as in Equation 1, i.e., arbitrarily chosen to be 1:

$$(C_3 \cdot N_{3RT} + C_4 \cdot N_{7RT}) + (C_3 \cdot N_{6RT} + C_4 \cdot N_{2RT}) = 1$$

$$C_3 \cdot (N_{3RT} + N_{6RT}) + C_4 \cdot (N_{7RT} + N_{2RT}) = 1$$

Equations 1 and 2 specify that all four resulting, interpolated round-trip beams have identical magnitudes when the transmit aperture is not blocked.

Equation 3
With the beam aperture half blocked, the above condition (c) is expressed as the following equation:

$$(C_1 \cdot B_{4RT} + C_2 \cdot B_{8RT}) = (C_1 \cdot B_{5RT} + C_2 \cdot B_{1RT})$$

$$(C_1 \cdot B_{4RT} + C_2 \cdot B_{8RT}) - (C_1 \cdot B_{5RT} + C_2 \cdot B_{1RT}) = 0$$

$$C_1 \cdot (B_{4RT} - B_{5RT}) + C_2 \cdot (B_{8RT} - B_{1RT}) = 0$$

Equation 4
With the beam aperture half blocked, the above condition (d) is expressed as the following equation:

$$(C_3 \cdot B_{3RT} + C_4 \cdot B_{7RT}) = (C_3 \cdot B_{6RT} + C_4 \cdot B_{2RT})$$

$$(C_3 \cdot B_{3RT} + C_4 \cdot B_{7RT}) - (C_3 \cdot B_{6RT} + C_4 \cdot B_{2RT}) = 0$$

$$C_3 \cdot (B_{3RT} - B_{6RT}) + C_4 \cdot (B_{7RT} - B_{2RT}) = 0$$

Equation 5
With the beam aperture half blocked, the average magnitude (sum) of the inner combined beams is set to be identical to the average magnitude (sum) of the outer combined beams, as is expressed in condition (e).

$$(C_1 \cdot B_{4RT} + C_2 \cdot B_{8RT}) + (C_1 \cdot B_{5RT} + C_2 \cdot B_{1RT}) =$$
$$(C_3 \cdot B_{3RT} + C_4 \cdot B_{7RT}) + (C_3 \cdot B_{6RT} + C_4 \cdot B_{2RT})$$

-continued $$(C_1 \cdot B_{4RT} + C_2 \cdot B_{8RT}) + (C_1 \cdot B_{5RT} + C_2 \cdot B_{1RT}) -$$
$$(C_3 \cdot B_{3RT} + C_4 \cdot B_{7RT}) + (C_3 \cdot B_{6RT} + C_4 \cdot B_{2RT}) = 0$$
$$C_1 \cdot (B_{4RT} + B_{5RT}) + C_2 \cdot (B_{8RT} + B_{1RT}) -$$
$$C_3 \cdot (B_{3RT} + B_{6RT}) - C_4 \cdot (B_{7RT} + B_{2RT}) = 0$$

Equations 3, 4 and 5 specify that all four resulting combined beams have identical magnitudes with the aperture half blocked, although that magnitude is left unspecified.

Note that under normal beam conditions, the magnitudes of the inner resulting combined beams are identical; this can be expressed as:

$$(C_1 \cdot N_{4RT} + C_2 \cdot N_{8RT}) = (C_1 \cdot N_{5RT} + C_2 \cdot N_{1RT})$$

Similarly, the magnitudes of the outer resulting combined beams are identical; this can be expressed as:

$$(C_3 \cdot N_{3RT} + C_4 \cdot N_{7RT}) = (C_3 \cdot N_{6RT} + C_4 \cdot N_{2RT})$$

Any solution found from equations 1 through 5 will also satisfy the last two equations due to the overall symmetry.

Equations 1 through 5 can be combined into a single matrix equation and solved as follows:

$$\begin{vmatrix} (N_{4RT} + N_{5RT}) & (N_{8RT} + N_{1RT}) & 0 & 0 \\ 0 & 0 & (N_{3RT} + N_{6RT}) & (N_{7RT} + N_{2RT}) \\ (B_{4RT} - B_{5RT}) & (B_{8RT} - B_{1RT}) & 0 & 0 \\ 0 & 0 & (B_{3RT} - B_{6RT}) & (B_{7RT} - B_{2RT}) \\ (B_{4RT} + B_{5RT}) & (B_{8RT} + B_{1RT}) & -(B_{3RT} + B_{6RT}) & -(B_{7RT} + B_{2RT}) \end{vmatrix} \begin{vmatrix} C_1 \\ C_2 \\ C_3 \\ C_4 \end{vmatrix} = \begin{vmatrix} 1 \\ 1 \\ 0 \\ 0 \\ 0 \end{vmatrix}$$

The above matrix and vectors can then be represented with single symbols:

$$X \cdot \underline{C} = A$$

where X is the matrix containing round-trip beam magnitudes, C is the "vector" of coefficients, and A is the "goal" vector. X is not a square matrix, because the specifications are over-constrained (there are more equations than unknown coefficients). Therefore, it is not possible to solve the matrix equation exactly using the inverse matrix method. However, the Moore-Penrose, pseudo-inverse method, based on singular value decomposition, can be used to obtain a solution that is optimal in the sense of having the lowest mean square magnitude. (There are other possible solutions that are optimal in some other sense, such as having the fewest possible non-zero components.) The pseudo-inverse solution is then:

$$C = pinv(X) \cdot A$$

It is interesting to note that if Equation 1 and 2 were combined (subtracted), eliminating the arbitrary gain constant, the matrix X would be square. However, the A vector would then be all zeros, which would make it difficult to find a non-zero solution for the coefficients.

The coefficients are ultimately used to combine the round-trip beams in the RF or complex domain, not beam magnitudes. The validity of this approximation can be checked by examining the resulting combined beams. The coefficients computed for the depth of 16 centimeters are 0.5925, 0.4075, 0.6026 and 0.3742, and the coefficients for the depth of 12 centimeters are 0.5837, 0.4163, 0.5769, and 0.3988. These coefficients were also scaled so that $C_1 + C_2 = 1$.

Figure 8:
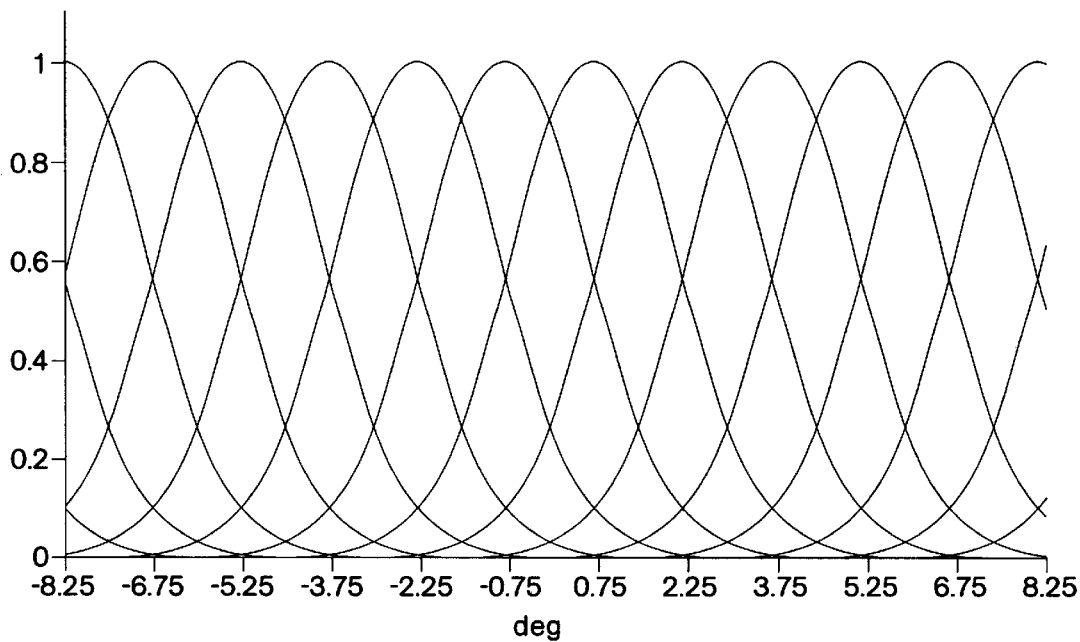
FIG. 8 are beam plot simulations of round-trip beams each formed by interpolating two receive beams shown in FIGS. 7A, 7B and 7C.
Figure 9:
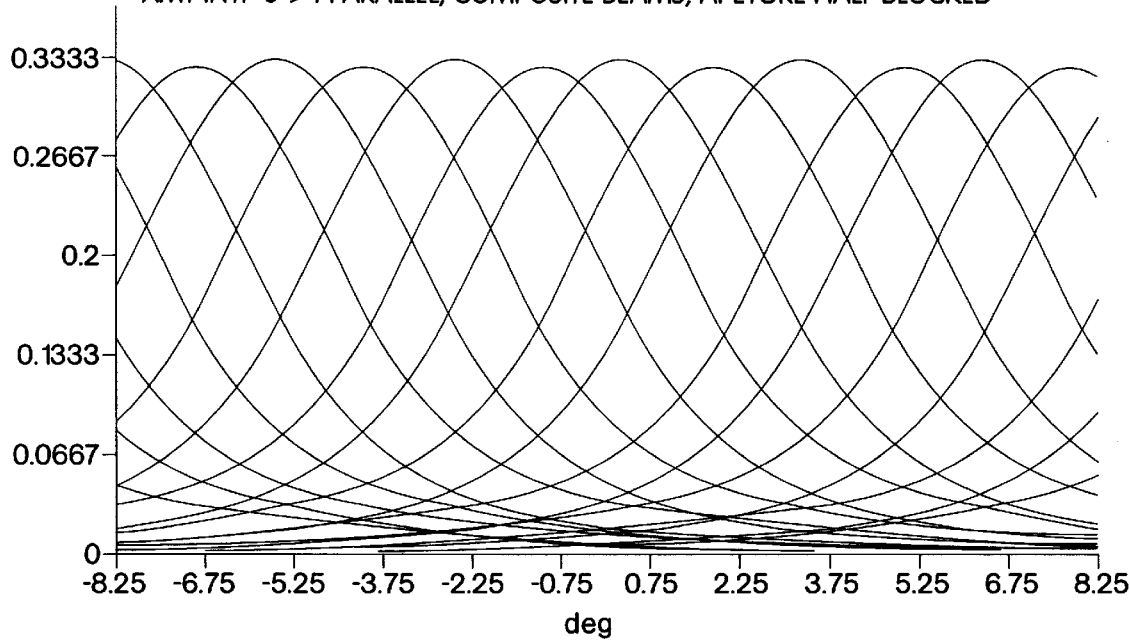
FIG. 9 depicts beam plot simulations of round-trip beams each formed by interpolating two receive beams, wherein the transducer array has one half of its aperture blocked.

Referring to FIGS. 8 and 9, the coefficients and the complex round-trip beamplots were used to construct beamplots for the resulting combined beams under normal conditions and with the aperture half-blocked, respectively. FIG. 8 depicts beamplots for the interpolated round-trip beams under normal conditions; these beams are used to image the scanned sector. FIG. 9 depicts beamplots for the round-trip, interpolated beams with one half of the aperture blocked. The plotted beams are nearly identical in magnitude, steering, and shape and thus the image will have no artifacts due to the blocked aperture.

Figure 10:
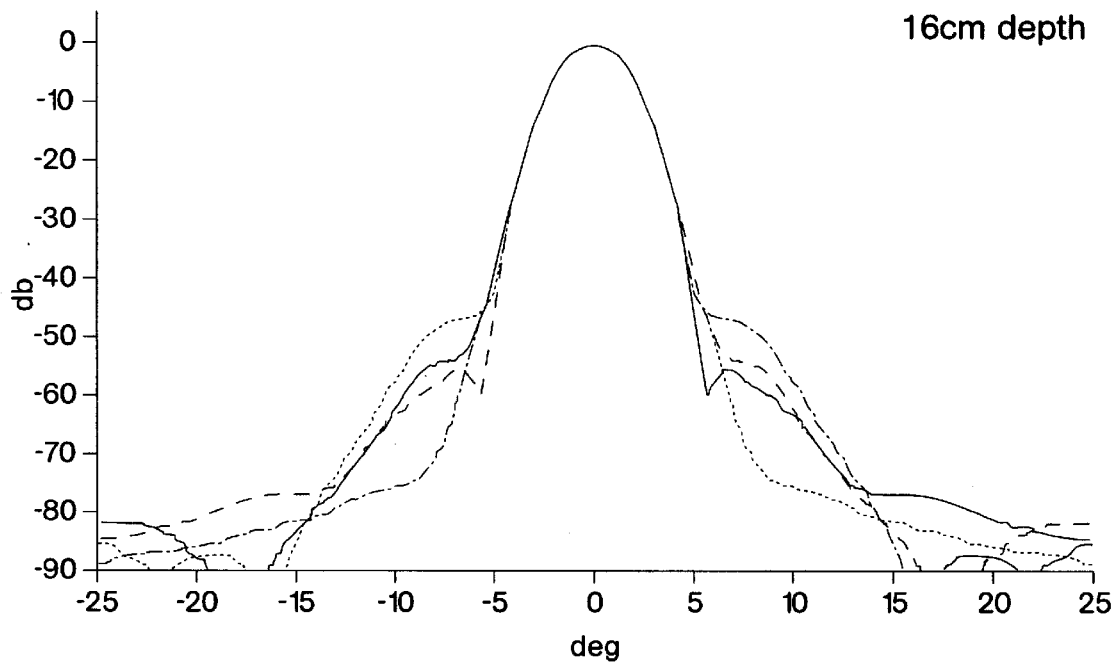
FIG. 10 are beam plot simulations of the interpolated beams at a depth of 16 centimeters.

Referring to FIG. 10, shows beam plot simulations of the interpolated beams at a depth of 16 centimeters on a logarithmic (dB) vertical scale. The plotted beams do have asymmetric side lobes. However, the side lobes are sufficiently small so that the asymmetry is negligible and does not affect significantly the image.

Figure 11:
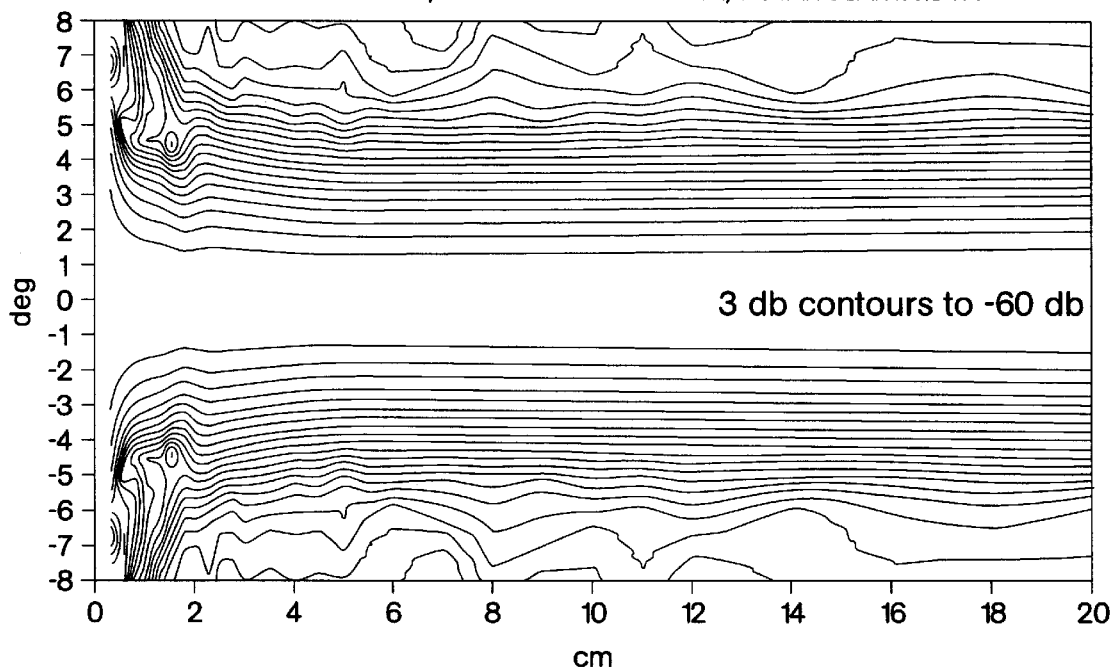
FIG. 11 are beam plot simulations of the polar beamwidth as a function of the depth for the interpolated beams.

FIG. 11 is a plot of the polar beamwidth as a function of the depth for the composite interpolated beams. The reduced transmit aperture greatly increases the depth of field. The focusing is very uniform from about 1 cm to infinity. However, due to the need to use a broad transmit beam, it may be difficult to obtain the acoustic power density used in a system with a larger transmit aperture and stronger focus.

Additional embodiments are within the following claims:

I claim:

1. An ultrasound apparatus for imaging a region of interest comprising a transmit array of ultrasound transducer elements connected to a transmit beamformer constructed and arranged to transmit an ultrasound beam along multiple transmit scan lines distributed over a region of interest;

a receive array of ultrasound transducer elements connected to a receive beamformer constructed and arranged to synthesize at least four receive beams in response to each said transmit beam, said receive beamformer being constructed to steer each said synthesized receive beam to have a selected orientation so that a corresponding round-trip beam, formed by said transmit beam and said steered receive beam, has a selected round-trip orientation;

an interpolator connected to said receive beamformer and arranged to obtain two of said round-trip beams having substantially the same round-trip orientation and being synthesized in response to said transmit beams emitted along two neighboring transmit scan lines, said interpolator being constructed and arranged to interpolate said two round-trip beams to form an image signal of a desired beam profile oriented along said round-trip orientation; and an image generator constructed and arranged to form an image of said region of interest based on said image signals.

2. The ultrasound apparatus of claim 1 further including a T/R switch connected to said transmit array and said receive array which are formed by the same transducer array.

3. The ultrasound apparatus of claim 1 wherein said transmit beamformer is constructed to transmit said transmit beams along said scan lines having a selected angular spacing over a wedge-shaped scan pattern, and said receive beamformer is constructed to synthesize said receive beams so that said round-trip beams are distributed over said wedge-shaped scan pattern.

4. The ultrasound apparatus of claim 1 wherein said transmit beamformer is constructed to transmit said transmit beams along said scan lines spaced over a parallelogram-shaped scan pattern, and said receive bemformer is constructed to synthesize said receive beams so that said round-trip beams are distributed over said parallelogram-shaped scan pattern.

5. The ultrasound apparatus of claim 1 wherein said receive beamformer is further constructed to synthesize at least eight receive beams.

6. The ultrasound apparatus of claim 1 wherein said receive beamformer is further constructed to steer said synthesized receive beams dynamically.

7. The ultrasound apparatus of claim 1 wherein said interpolator includes a line buffer, a multiplier, and a summer.

8. The ultrasound apparatus of claim 7 wherein said line buffer is constructed to delay a first of said two beams synthesized first in time so that said two receive beams can be summed by said summer.

9. The ultrasound apparatus of claim 7 wherein said multiplier is constructed to multiply signals of said round trip beam so that said interpolated beams are uniform in size and shape.

10. The ultrasound apparatus of claim 1 wherein said receive beamformer is an analog beamformer and said interpolator is an analog interpolator.

11. The ultrasound apparatus of claim 1 further including an A/D converter, and wherein said receive beamformer is a digital beamformer and said interpolator is a digital interpolator.

12. An ultrasound apparatus for imaging a region of interest comprising
means for transmitting ultrasound beams along several transmit scan lines distributed over a region of interest;
means for synthesizing for each transmitted ultrasound beam several receive beams, said synthesizing means being arranged to steer said receive beam in a way that a corresponding round-trip beam, formed by said transmitted beam and said steered receive beam, has a selected orientation aligned with one of several round-trip scan lines;
interpolating means arranged to obtain from said synthesizing means two round-trip beams that were synthesized in response to two beams transmitted along two neighboring transmit scan lines and were synthesized to have substantially the same orientation of their round-trip beams along a selected round-trip scan line;
said interpolating means interpolating said two round-trip beams, having substantially the same selected round-trip orientation, to form an image signal of a desired profile along said selected round-trip scan line; and
means for forming an image of said region of interest based on said image signals arranged over an array of said round-trip scan lines.

13. The ultrasound apparatus of claim 12 wherein said interpolating means employing interpolation coefficients selected to minimize an artifact in said image.

14. The ultrasound apparatus of claim 13 wherein said interpolation coefficients are selected so that said profiles of said image signals are uniform in size and shape.

15. The ultrasound apparatus of claim 12 wherein said transmitting means include a transmit aperture and said receiving means include a receive aperture, wherein said transmit aperture is smaller than said receive aperture.

16. The ultrasound apparatus of claim 15 wherein said transmit aperture produces said transmit beam having a beam width approximately equal to a spacing of said transmit scan lines.

17. The ultrasound apparatus of claim 15 wherein at least one of said apertures is apodized with a Hamming function.

18. A phased array ultrasound imaging method comprising
transmitting ultrasound beams along several transmit scan lines distributed over a region of interest;
synthesizing for each transmitted ultrasound beam several receive beams, each said receive beam being steered to so that a corresponding round-trip beam, formed by said transmitted beam and said steered receive beam, has a selected orientation aligned with one of several round-trip scan lines;
providing two round-trip beams that were synthesized in response to two beams transmitted along two neighboring transmit scan lines and were synthesized to have substantially the same round-trip orientation along a selected round-trip scan line;
interpolating said two provided round-trip beams, having substantially the same selected round-trip orientation, to form an image signal of a desired profile along said selected round-trip scan line; and
forming an image of said region of interest based on said image signals arranged over an array of said round-trip scan lines.

19. The ultrasound method of claim 18 wherein said interpolating step includes employing interpolation coefficients selected to minimize an artifact in said image.

20. The ultrasound method of claim 18 wherein said transmitting or receiving steps include employing an apodized aperture.

21. An ultrasound method of imaging a region of interest comprising the steps of
transmitting, by a transmit array of ultrasound transducer elements, a first ultrasound beam along a first transmit scan line having a first selected transmit orientation with respect to said array;
receiving, from a receive array of ultrasound transducer elements, signals corresponding to a first set of at least four receive beams synthesized by a receive beamformer in response to said first ultrasound beam, each said receive beam being steered to have a selected receive orientation so that a corresponding round-trip beam, formed by said first transmit beam and said steered receive beam, has a selected round-trip orientation;
transmitting, by said transmit array, a second ultrasound beam along a second transmit scan line having a second selected transmit orientation with respect to said array;
receiving, from said receive array, signals corresponding to a second set of at least four receive beams synthesized by said receive beamformer in response to said second ultrasound beam, each said synthesized receive beam being steered to have a selected receive orientation so that a corresponding round-trip beam, formed by said second transmit beam and said steered receive beam, has a selected round-trip orientation;
selecting from said first set and from said second set two round-trip beams having substantially the same selected round-trip orientation;

interpolating said two selected round-trip beams to form an image signal of a desired profile along said same round-trip orientation; and forming an image of a region of interest based on several said image signals.

22. The ultrasound method of claim 21 wherein said transmit array and said receive array are formed by the same transducer array operating in a transmitting mode and a receiving mode.

23. The ultrasound method of claim 21 wherein said transmitting step includes emitting said transmit beams along said scan lines having a selected angular spacing over a wedge-shaped scan pattern, and said synthesizing of said receive beams includes orienting said round-trip beams to have another angular spacing over said wedge-shaped scan pattern.

24. The ultrasound method of claim 21 wherein said transmitting step includes emitting said transmit beams along said scan lines linearly spaced over a parallelogram-shaped scan pattern, and said synthesizing of said receive beams includes generating said round-trip beams with another linear spacing over said parallelogram-shaped scan pattern.

25. The ultrasound method of claim 21 wherein said receiving step includes synthesizing at least eight receive beams.

26. The ultrasound method of claim 21 wherein said interpolating step includes employing interpolation coefficients selected to minimize an artifact in said image.

27. The ultrasound method of claim 26 wherein said artifact is caused by a partially blocked aperture of said transmit array.

28. The ultrasound method of claim 26 wherein said interpolation coefficients are calculated so that said profiles of said image signals are uniform in size and shape.

29. The ultrasound method of claim 21 wherein said transmitting and receiving steps include employing a transmit aperture and a receive aperture, respectively, wherein said transmit aperture is smaller than said receive aperture.

30. The ultrasound method of claim 29 wherein said transmit aperture produces said transmit beam having a beam width approximately equal to a spacing of said transmit scan lines.

* * * * *